United States Patent
Butler et al.

(10) Patent No.: US 9,766,411 B2
(45) Date of Patent: Sep. 19, 2017

(54) OPTICAL INTERFACE DEVICES AND METHODS EMPLOYING OPTICAL FIBERS AND A SUPPORT MEMBER HAVING A BEND SECTION

(71) Applicant: Corning Optical Communications LLC, Hickory, NC (US)

(72) Inventors: Douglas Llewellyn Butler, Painted Post, NY (US); William Kenneth Denson, Big Flats, NY (US); James Scott Sutherland, Corning, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/946,977

(22) Filed: Nov. 20, 2015

(65) Prior Publication Data

US 2017/0146745 A1   May 25, 2017

(51) Int. Cl.
*G02B 6/36* (2006.01)
*G02B 6/42* (2006.01)

(52) U.S. Cl.
CPC ......... *G02B 6/3616* (2013.01); *G02B 6/3652* (2013.01); *G02B 6/4249* (2013.01); *G02B 6/4257* (2013.01)

(58) Field of Classification Search
CPC .............................. G02B 6/3616; G02B 6/3652
See application file for complete search history.

(56) References Cited

U.S. PATENT DOCUMENTS

| | | |
|---|---|---|
| 5,155,785 A | 10/1992 | Holland et al. |
| 6,257,772 B1 * | 7/2001 | Nakanishi ............ G02B 6/4212 |
| | | 257/432 |
| 6,402,389 B1 | 6/2002 | Steijer et al. |

(Continued)

FOREIGN PATENT DOCUMENTS

| | | |
|---|---|---|
| DE | 102012110903 A1 | 5/2014 |
| EP | 2546688 A1 | 1/2013 |

(Continued)

OTHER PUBLICATIONS

Berglund, S. and Selli, R., "Application of V-Groove Technology for Small Form Factor Connector and Transceiver Modules," 49th Electronic Components and Technology Conference, 1999, p. 392-397.

(Continued)

*Primary Examiner* — Omar R Rojas
(74) *Attorney, Agent, or Firm* — Michael E. Carroll, Jr.

(57) ABSTRACT

Optical interface devices and methods employing optical fibers and support member having a bend section are disclosed, wherein the optical interface device is used for optically connecting at least one photonic device to at least one optical device via at least one optical fiber. An array of optical fibers is arranged immediately adjacent a portion of the outer curved surface at the bend section. A fiber alignment member having a fiber alignment feature engages the array of optical fibers at a back-end flat portion of the support member so that end faces of the optical fibers are substantially co-planar with a bottom surface of the fiber (Continued)

alignment member and a back end of the support member. A securing layer disposed over the optical fiber array serves to secure the optical fiber array to the outer.

29 Claims, 12 Drawing Sheets

(56) References Cited

U.S. PATENT DOCUMENTS

| | | |
|---|---|---|
| 7,802,927 B2 | 9/2010 | Benjamin et al. |
| 7,894,691 B2 * | 2/2011 | Ikeda ................. G02B 6/43 385/14 |
| 2009/0016734 A1 | 1/2009 | Hamazaki |
| 2013/0322814 A1 | 12/2013 | Lee |
| 2014/0177995 A1 * | 6/2014 | Mohammed ............. G02B 6/36 385/14 |

FOREIGN PATENT DOCUMENTS

| | | |
|---|---|---|
| JP | 2005292718 A | 10/2005 |
| JP | 2008020766 A | 1/2008 |
| JP | 05102550 B2 | 12/2012 |
| WO | 03003060 A2 | 1/2003 |

OTHER PUBLICATIONS

Suzuki, A et al., "Vertically Pluggable and Compact 10-Gb/s 12-Channel Optical Modules With Anisotropic Conductive Film for Over 100-Gb/s Optical Interconnect Systems," J. Lightwave Technology, vol. 27, Issue 15, Aug. 1, 2009, pp. 3249-3258.

Mu Hee Cho, et al., "High-Coupling-Efficiency Optical Interconnection Using a 90°-Bent Fiber Array Connector in Optical Printed Circuit Boards," Photonics Technology Letters, vol. 17, Issue 3, 2005, p. 690-692.

EP16198677 Search Report dated Mar. 28, 2017, European Patent Office, 3 Pgs.

* cited by examiner

OPTICAL INTERFACE DEVICES AND METHODS EMPLOYING OPTICAL FIBERS AND A SUPPORT MEMBER HAVING A BEND SECTION

FIELD

The present disclosure relates to optical interface devices, and in particular relates to optical interface devices and methods that employ optical fibers and a support member having a bend section, where the optical interface device is used to form optical interconnections between a photonic device supported by a photonic integrated circuit board and another optical device such as an optical fiber connector or an electrical-optical device.

BACKGROUND

Certain optical and electrical-optical devices have photonic integrated circuit boards (PICBs) that incorporate active and/or passive optical elements, such as photonic integrated circuits (PICs) and passive optical waveguides. These optical elements need to be optically interfaced (optically coupled) with another optical device so that optical signals can be received and processed by the device, and also transmitted from the device to another device or to a back plane or to the PICB. This often requires plug-in or receptacle optical connectors that, in some respects, may be similar to plug-in and receptacle electrical connectors used for electrical circuit-board components. Alternatively, the optical interface may be accomplished with a connector end adapted to be permanently (or semi-permanently) fixed to the PICB to establish and maintain optical communication with corresponding devices (e.g., photodetectors or phototransmitters) on the PICB.

Because interior space is typically at a premium for most optical and electrical-optical devices, the optical interface devices and the PICBs are typically compact so that they can fit into tight spaces. For example, multiple PICBs are often arranged in a stacked configuration within data communications racks, so that the height of the optical interface devices is as small as possible while still being able to carry out their function for transmitting optical signals with suitable optical performance.

Consequently, there is a need for continuing improvements to PICB technology that provide for compact configurations while also providing for high-efficiency optical coupling between the PICB and another device to which it is optically coupled.

SUMMARY

An aspect of the disclosure is an optical interface device for optically connecting at least one photonic device to at least one optical device via at least one optical fiber. The optical interface device includes: a support member having a body made of a single glass material and having an outer surface and a front-end section with a front end and a front-end flat portion, a back-end section with a back end and a back-end flat portion, wherein the glass body includes a bend section that includes a curved portion of the outer surface; at least one optical fiber arranged immediately adjacent at least a portion of the outer curved surface, the at least one optical fiber having a front-end portion that resides beyond the front end of the support member and includes a first end face, an opposite back-end portion that includes a second end face, and a fiber bend section between the first and second end portions and that resides at the support member bend section; a fiber alignment member having bottom and front surfaces, the front surface having at least one fiber alignment feature, with the fiber alignment member being secured to the back-end flat portion with the back-end portion of the at least one optical fiber engaged by the at least one fiber alignment feature, and wherein the second end face is substantially co-planar with bottom surface of the fiber alignment member; and a securing layer disposed over the at least one optical fiber at least at the front-end section of the support member.

Another aspect of the disclosure is a photonic device assembly that includes: the optical interface device described herein and operably arranged relative the at least one photonic device, with the second end face of the at least one optical fiber optically coupled to the at least one photonic device; and the at least one optical fiber optically coupled to the at least one optical device via the first end face at the first end portion of the at least one optical fiber.

Another aspect of the disclosure is a method of forming an optical interface device for optically connecting one or more photonic devices to at least one optical device via at least one optical fiber. The method includes: a) providing a support member having a body made of a single glass material and having an outer surface and a front-end section with a front end and a front-end flat portion, a back-end section with a back end and a back-end flat portion, wherein the glass body includes a bend section that includes a curved portion of the outer surface; b) holding an array of optical fibers in a select configuration; c) disposing the array of optical fibers over the outer surface of the support member; d) securing the optical fibers to the outer surface of the support members so that the optical fibers have the select configuration, with each optical fiber having: i) a fiber bend section that resides adjacent the curved portion of the outer surface of the support member; and ii) a first fiber end face that resides substantially in a plane defined by the back end of the support member.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation. Likewise, terms such as "vertical" and "horizontal" are used for the sake of reference and are not intended to be limiting as to orientation or direction.

The vertical dimensions LY' and LY are used to refer to the height of the preform and support member respectively, and the relatively small values of LY as discussed below define the low-profile nature of the optical interface devices disclosed herein. In an example, LY and LY' are each referred to as a "height dimension."

The units of millimeters are abbreviated below as "mm," and the units of microns are also abbreviated in some instances as "µm."

The term "actinic radiation" is used below to refer to any radiation that can activate a joining or adhesive material, such as the joining material, adhesive material or support material discussed below. An example of actinic radiation is light having an ultraviolet (UV) wavelength that activates a UV-curable adhesive. Another example of actinic radiation is infrared (IR) radiation that activates a thermally curable adhesive.

Support Member

Figure 1A:
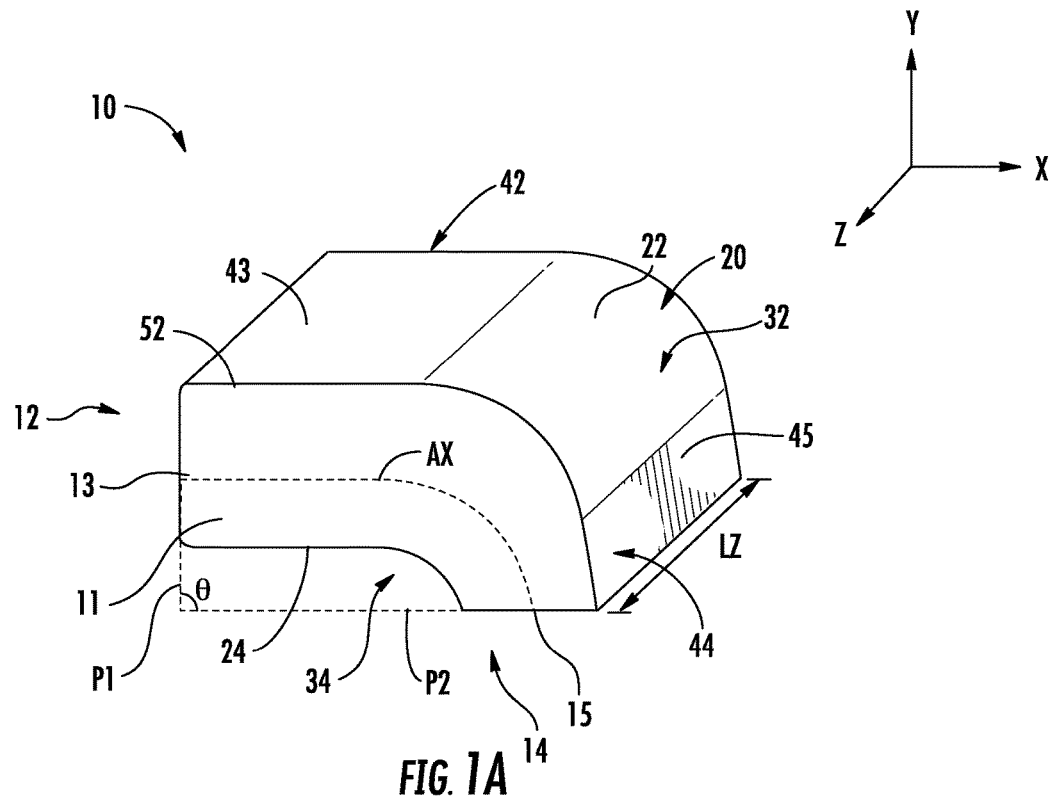
FIG. 1A is a top elevated view and FIG. 1B is a side view of an example curved or "bent" waveguide support member used in forming the optical interface devices and carrying out the methods as disclosed herein.
Figure 1B:
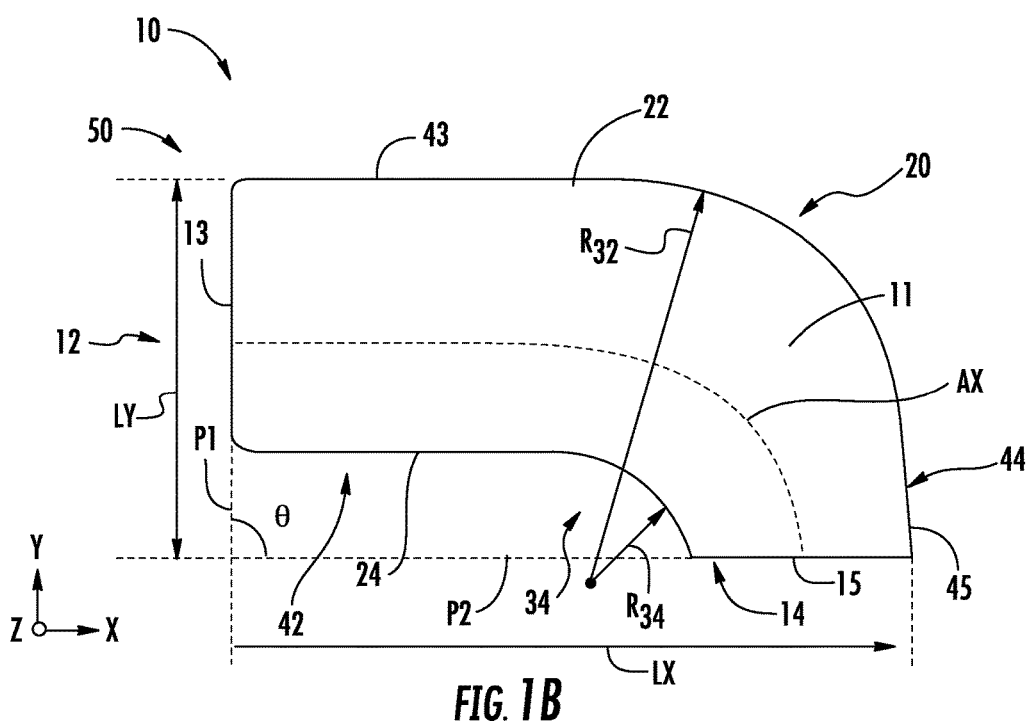

FIG. 1A is a top elevated view and FIG. 1B is a side view of an example curved or "bent" optical fiber support member ("support member") 10. The support member 10 has a body 11 that may be made of any suitable material(s) or construction. By way of example and not limitation, body 11 may be monolithic and further in an example may be made of a glass, such as a glass with a CTE (Coefficient of Thermal Expansion) close to the CTE of photonic chip materials (e.g., silicon). Example glasses include PYREX® glass, Gorilla® glass and WILLOW® 7740 glass, which may optionally be chemically strengthened. In an example, body 11 has a bulk refractive index $n_b$. The support member 10 includes a front end 12 with a planar surface 13, a back end 14 with a planar surface 15, an upper (or outer) surface 22 and a lower (or inner) surface 24. In certain applications where clearance beneath the lower surface 24 is not required, the lower surface 24 may be made coplanar with the planar surface 15, so that body 11 provides an enlarged lower surface area. This enlarged lower surface area may be used to increase the mechanical strength of the bond at the back end 14.

The support member 10 also includes a bend section 20 that defines an outer curved portion 32 of upper surface 22 and an inner curved portion 34 of lower surface 24. In an example, outer curved portion 22 has an outer radius of curvature $R_{32}$ while the inner curved portion has an inner radius of curvature $R_{34}$. In an example, the inner radius of curvature $R_{34}$ is in the range 0.5 mm≤$R_{34}$≤1.5 mm, with $R_{34}$=1 mm being an exemplary value. Likewise, the outer radius of curvature $R_{32}$ is in the range 0.9 mm≤$R_{32}$≤3.5 mm, with $R_{32}$=2.3 mm being an exemplary value when standard size optical fibers with diameters around 125 um are employed. The outer radius of curvature $R_{32}$ may be reduced to smaller values, such as 1.9 mm for 100 µm diameter optical fiber, 1.5 mm for 80 µm diameter optical fiber, 1.2 mm for 62.5 µm diameter optical fiber, and 0.9 mm for 50 µm diameter optical fiber. In general, a minimum value for the outer radius of curvature $R_{32}$ (in mm) may be the optical fiber diameter (in um) times 0.0186. The centers of the radii of curvatures $R_{32}$ and $R_{34}$ need not coincide.

The support member 10 has a front-end section 42 that includes front end 12 and a back-end section 44 that includes back end 14. The front-end section 42 includes a front-end flat portion 43 of outer surface 22 while the back-end section includes a back-end flat portion 45 of the outer surface. A curved central axis AX runs between the front end 12 and the back end 14. In an example, bend section 20 has an associated bend angle θ defined by the intersection of a first plane P1 defined by front-end planar surface 13 and a second plane P2 defined by back-end planar surface 15. In one example, the bend angle θ can be in the range 45°≤θ≤90°, while in other examples the bend angle can be in the range from 60°≤θ≤90° or 80°≤θ≤90°. For the bend angle of 90° shown in FIGS. 1A and 1B, the front-end planar surface 13 lies in the y-z plane and the back-end planar surface 15 lies in the x-z plane. Other configurations are also possible where the bend angle θ is in the range of, for example, 80°≤θ≤90° and the first plane P1 is tilted away from the y-axis by an angle of about 8° or −8°. Alternatively, the bend angle θ may be 80°≤θ≤90°, and the first plane P1 may be parallel to the y-axis, but tilted away from the z-axis by a bend angle θ of about 8° or −8°.

The support member 10 has a length LX in the x-direction, a length LY in the y-direction (i.e., a "vertical" dimension or "height") and a length LZ (i.e., a "width") in the z-direction. In an example, LX is in the range 4 mm to 6 mm, LY is in the range 2 mm to 4 mm and LZ is in the range 2 mm to 4 mm. Of course, the concepts disclosed herein may be used with devices having other sizes as desired. The example support member 10 of FIGS. 1A and 1B has a cross-sectional shape that can be referred to as a "rounded L shape."

Figure 2A:
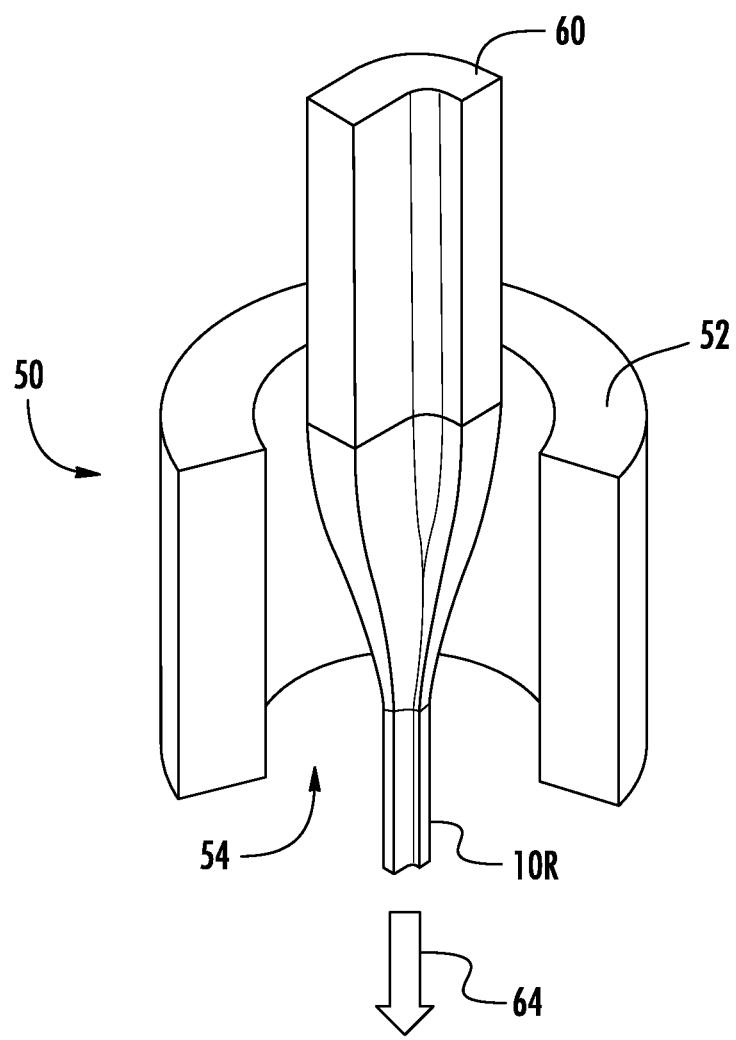
FIG. 2A is a top-elevated and partial cut-away view of a drawing system used to draw a preform into a support member rod that can be divided into individual support members.

In an example, support member 10 is formed using glass drawing techniques known in the art. Glass drawing techniques allow for the use of a preform that has the same overall shape as the final support member but with larger dimensions. FIG. 2A is a top-elevated and partial cut-away view of a drawing system 50 that includes a cylindrical heater 52 with an interior 54. A preform 60 that has the general cross-sectional shape of support member 10 is operably arranged within drawing system 50 so that is passes through interior 54, which defines a preform heating region. The cylindrical heater 52 heats preform 60 to a suitable drawing temperature as it passes through interior 54. The preform 60 is then drawn (e.g., by applying a drawing tension, as indicated by arrow 64) to form a reduced-dimension support member rod 10R.

In an experiment, a glass preform 60 with a rounded L shape and having dimensions of LX'=5 centimeters (cm), LY'=3 cm and LZ'=40 cm was drawn to form a support member rod 10R having corresponding dimensions LX=5 mm, LY=3 mm and LZ=40 mm and also having rounded L shape. This represents a 10X draw reduction process. In an example, support member rod 10R can be polished after it is drawn to ensure that the front-end and back-end planar surfaces 13 and 15 are truly flat and that any sharp corners are rounded off.

While the general shape of preform 60 is preserved during the drawing process, some melting and rounding of exposed corners can be expected due to preferential heating. Drawing experiments on rectangular glass blocks show that by reducing the drawing temperature to be, e.g., between 5% and 10% below normal drawing temperatures and increasing the drawing tension, rectangular corner features can be preserved with minimal corner rounding. For example, corner rounding can be obtained that is <10% of the width of a nearby flat feature.

Figure 2B:
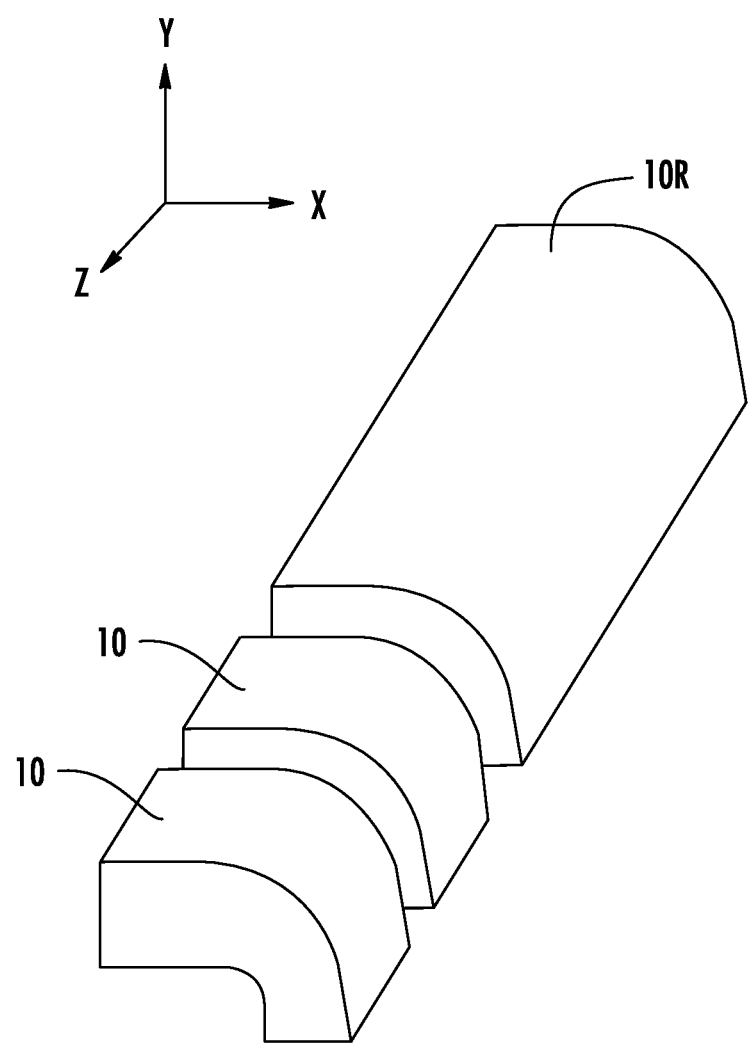
FIG. 2B is top elevated view of an example support member rod showing how the support member rod can be divided into individual support members.

FIG. 2B is a top-elevated view of an example support member rod 10R illustrating how support members 10 can be formed by dividing the support member rod into smaller sections. In an example, the support members 10 are formed by mechanically cutting support member rod at select z-positions along the length of the support member rod and then polishing the cut surfaces if necessary. In the example shown in FIG. 2B, the cutting is done in x-y planes, i.e., perpendicular to the long dimension (i.e., z-dimension) of support member rod 10R.

FIGS. 3A through 3D are top-elevated views of an example support member 10 that illustrate example process steps used in forming an example optical interface device. The support member 10 is shown, along with multiple optical fibers 100 that are in the process of being operably arranged on the support member. The multiple optical fibers 100 define an optical fiber array 100A.

Figure 3A:
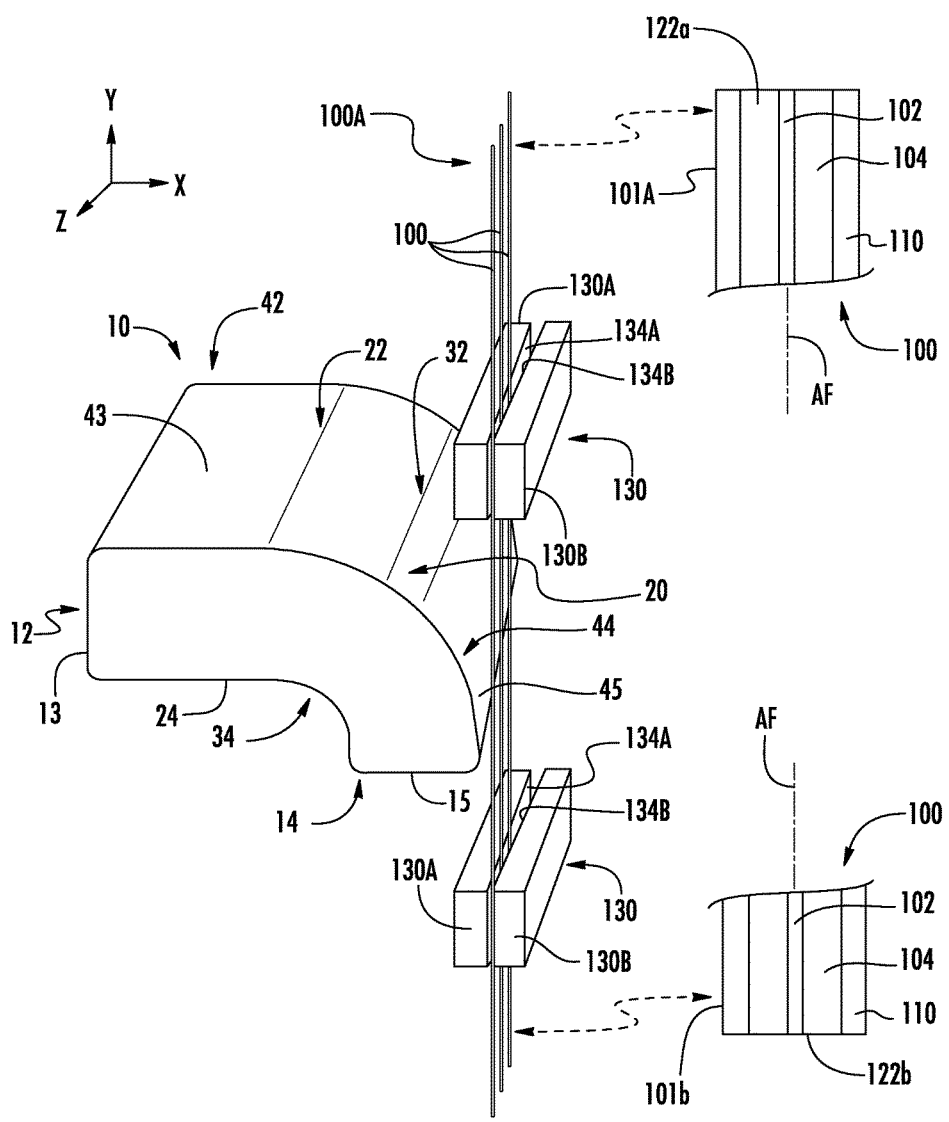
FIGS. 3A through 3D are top-elevated views of an example support member and an array of optical fibers arranged relative thereto, illustrating example method steps used in forming an example optical interface device.

As shown in the close-up insets of FIG. 3A, each optical fiber 100 includes a core 102 and a cladding 104 that surrounds the core. The core 102 and cladding 104 may be made of glass and are configured to form an optical waveguide, but other suitable materials are possible. The cladding 104 is surrounded by a non-glass coating 110, such as a polymer (e.g., polyurethane acrylate). When a portion of coating 110 is removed ("stripped") from optical fiber 100, the result is an exposed glass portion 112 (see, e.g., FIG. 4A, introduced an discussed below), which is referred to in the art as a "bare fiber," and is referred to hereinafter as bare fiber portion 112. Optical fiber 100 includes opposite end portions 101a and 101b that respectively include end faces 122a and 122b. The optical fiber 100 has a central axis AF that runs down the center of core 102. In the discussion below, reference is sometimes made to a single optical fiber 100 for ease of discussion.

Figure 3B:
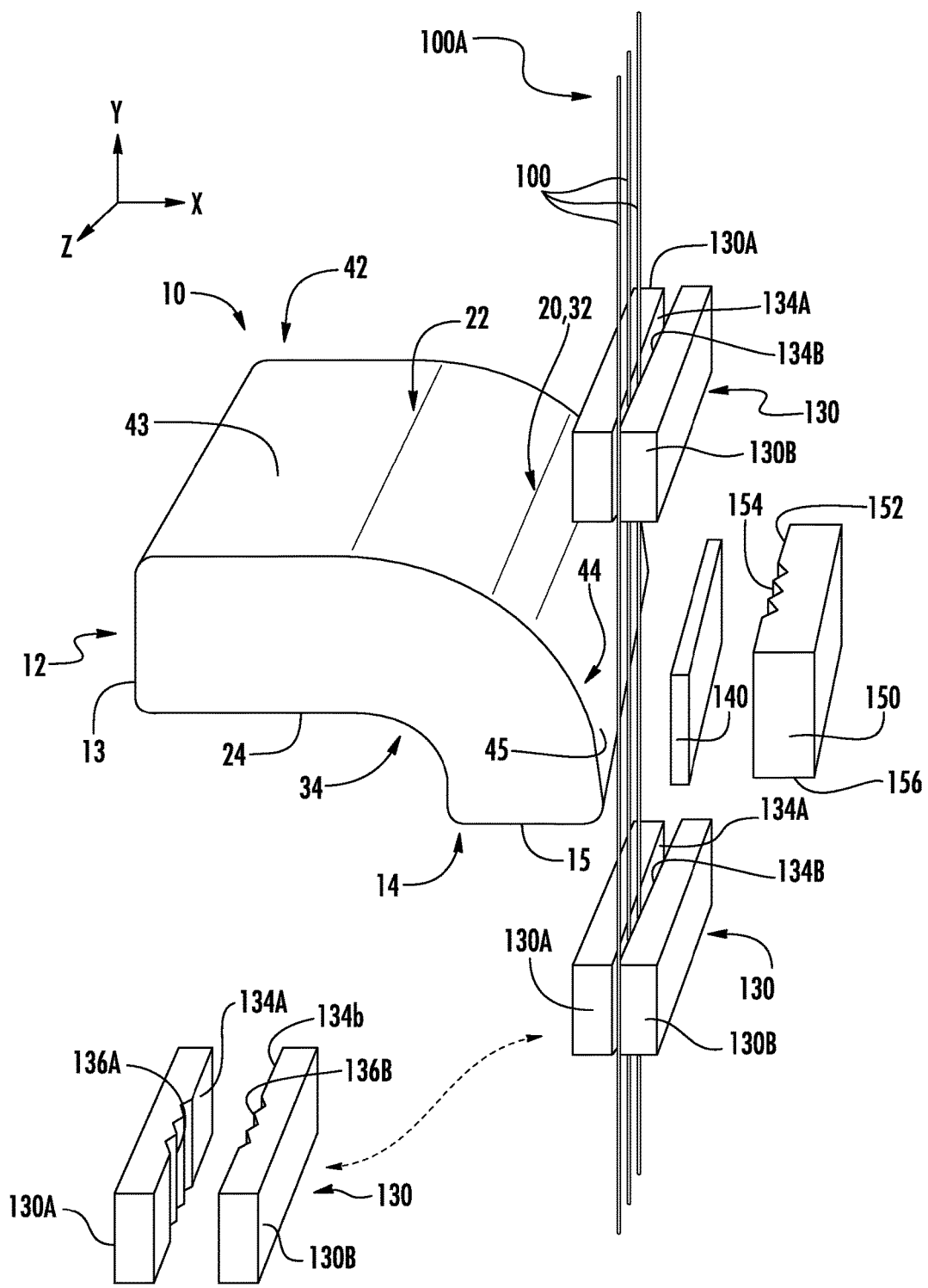
Figure 3C:
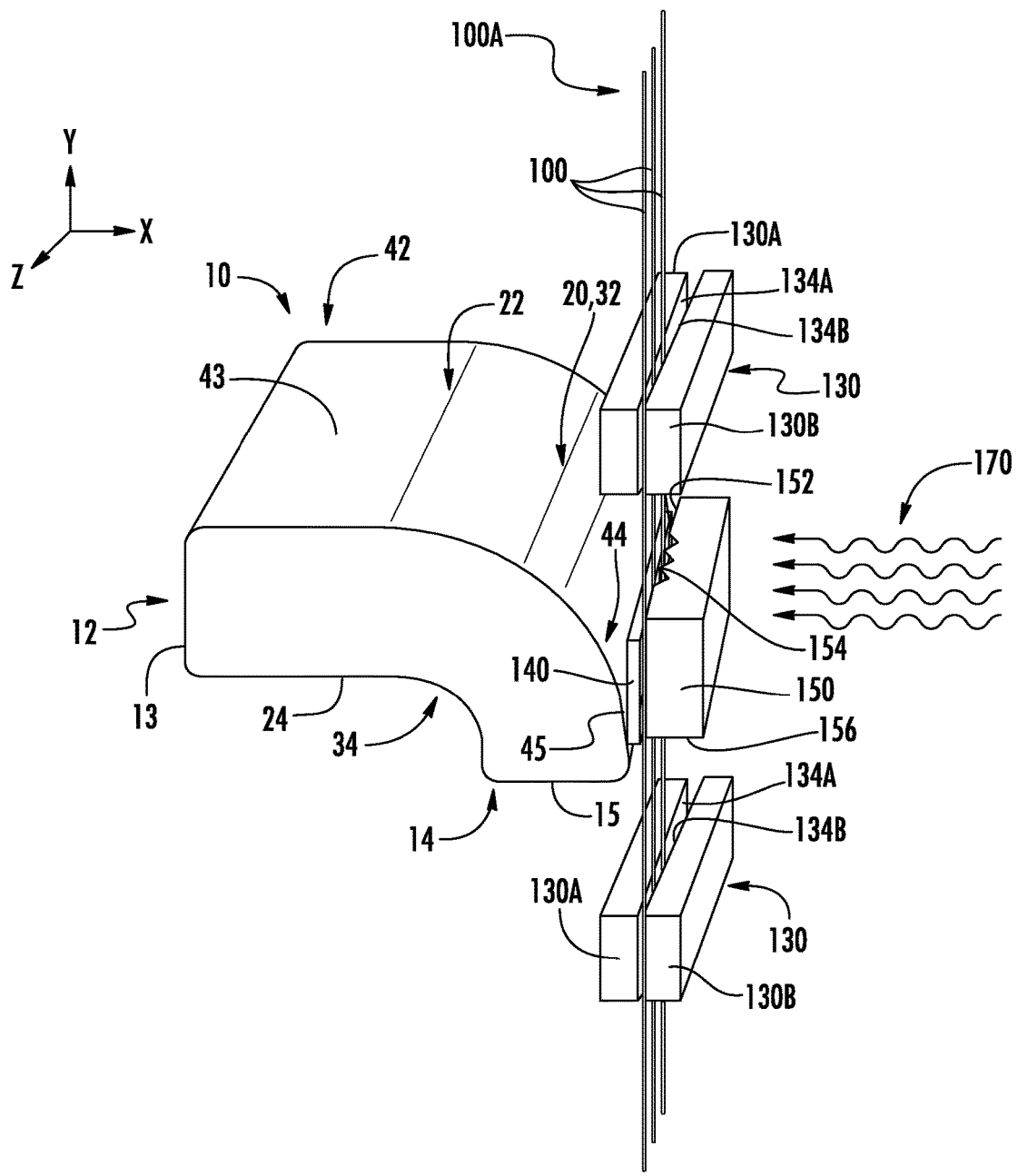

In FIGS. 3A through 3C, optical fibers 100 in optical fiber array 100A are shown by way of example as arranged adjacent back-end section 44 of support member 10 and in a y-z plane with the fibers generally parallel to one another. The optical fibers 100 are shown as being held by two spaced apart fiber gripper devices 130. In the example shown, fiber gripper devices 130 are each formed by a pair of gripper blocks 130A and 130B having respecting surfaces 134A and 134B that are confronting when the gripper blocks are operably arranged. The gripper blocks 130A and 130B can include corresponding at least one gripping feature 136A and 136B (e.g., V-grooves, a frictional material, a resilient material, etc.) formed in or on surfaces 134A and 134B (see close-up inset of FIG. 3B). The optional gripping feature 136A and 136B are configured so that when the blocks 130A and 130B are operably arranged with confronting surfaces 134A and 134B, gripping feature 136A and 136B act to hold optical fibers 100 in place and in a select configuration, including a select alignment. In an example, gripper blocks 130A and 130B can be made of a rigid material or an elastomeric material. Also in an example, gripper blocks 130A and 130B can be provided with vacuum capability (not shown) that allows for the optical fibers 100 to be fixed in place by the action of a vacuum while also allowing for some freedom to align the optical fibers by adjusting the amount of vacuum. In an example, the gripping feature 136A of gripper block 130A need not be the same as gripping feature 136B of gripper block 136B.

In an example, outer surface 22 of support member 10 does not include alignment features (e.g., grooves) for precise alignment of optical fibers 100 thereon. In an example, such alignment features (not shown) can be employed and can be formed on outer surface 22, e.g., by selective etching, by micromachining, using laser processing, etc.

In an example, fiber gripper devices 130 are configured to provide coarse alignment of optical fibers 100 in optical fiber array 100A. Also in an example, fiber gripper devices 130 provide for moderate tension on optical fibers 100 so that the optical fibers are maintained in select configuration, which for example may be a parallel configuration. For example, optical fibers 100 can be arranged to have a select pitch, e.g., 250 μm, with the course alignment being within tens of microns, e.g., +/−40 μm.

The optical fiber array 100A is arranged using fiber gripper devices 130 so that it just makes contact with the back-end section 44 of support member 10 at back-end flat portion 45, which serves as an optical alignment surface.

With reference now to FIG. 3B, a joining material 140 is applied over the portion of the optical fiber array 100A adjacent back-end section 44. The joining material 140 may be a filled or unfilled light-curable (e.g., ultraviolet or UV-curable) adhesive. Alternatively, joining material 140 may be composed of frit material that is either pre-applied to support member 10 and then fired in a prior step, or is an unfired green frit paste. A fiber alignment member 150 that includes a surface 152 with fiber alignment features 154 thereon (e.g., V-grooves) is brought into contact with the optical fiber array 100A and the joining material 140. The fiber alignment member 150 is then urged (e.g., pressed) against back-end section 44 of support member 10 such that the fiber alignment features 154 engage respective optical fibers 100 in the optical fiber array 100A, with the result of this operation illustrated in FIG. 3C. In this position, fiber alignment member 150 has a top surface 154 and an opposite bottom surface 156 that resides adjacent back end 14. In an example, fiber alignment member 150 is constituted by a single block of material.

In an example, fiber alignment features 154 of fiber alignment member 150 are configured to provide fine alignment of optical fibers 100, e.g., with a precision of 0.5 μm or less.

In an example where joining material 140 is or otherwise includes a light-curable adhesive that is cured by exposure to actinic radiation 170, force can be applied to fiber alignment member 150 to drive excess adhesive away from the region between the optical fiber array 100A and alignment features 154 in the fiber alignment members. While this force is applied, the adhesive is exposed to actinic radiation 170 to cure the adhesive. Thin adhesive layers and filled epoxy materials are desirable to minimize optical fiber misalignment shifts during adhesive curing. In this case, it may be important for fiber alignment member 150 to be substantially transparent to actinic radiation 170 so that the actinic radiation 170 can be directed to joining material 140 through the fiber alignment member, as illustrated in FIG. 3C.

In an example where joining material 140 is or otherwise includes a glass frit adhesive, a laser or other localized heat source (not shown) can be used to generate actinic radiation 170 in the form of heat that can be made incident upon the frit to cause it to soften. As with a light-curable adhesive, force applied to fiber alignment member 150 displaces excess glass frit, enabling the optical fiber array 100A and fiber alignment member 150 to come into close contact with each other.

An advantage of support member 10 that it enables the use of a fiber alignment member 150 that is not specifically transparent to wavelengths of actinic radiation 170 required to stabilize (in the case of light-curable adhesives) or liquefy (in the case of glass frits adhesives) joining material 140. For example, a low-cost Si or ceramic material that is not optical transparent at the desired adhesive processing wavelengths may be used to form fiber alignment member 150. The joining material 140 can be irradiated by actinic radiation 170 through support member 10, which in an example is made of a glass material that has low optical attenuation at the wavelength of the actinic radiation 170 used to activate or otherwise process joining material 140. Once joining material 140 is solidified, optical fibers 100 are held in precise (fine) alignment at back-end section 44 by fiber alignment member 150 and the solidified joining material.

Figure 3D:
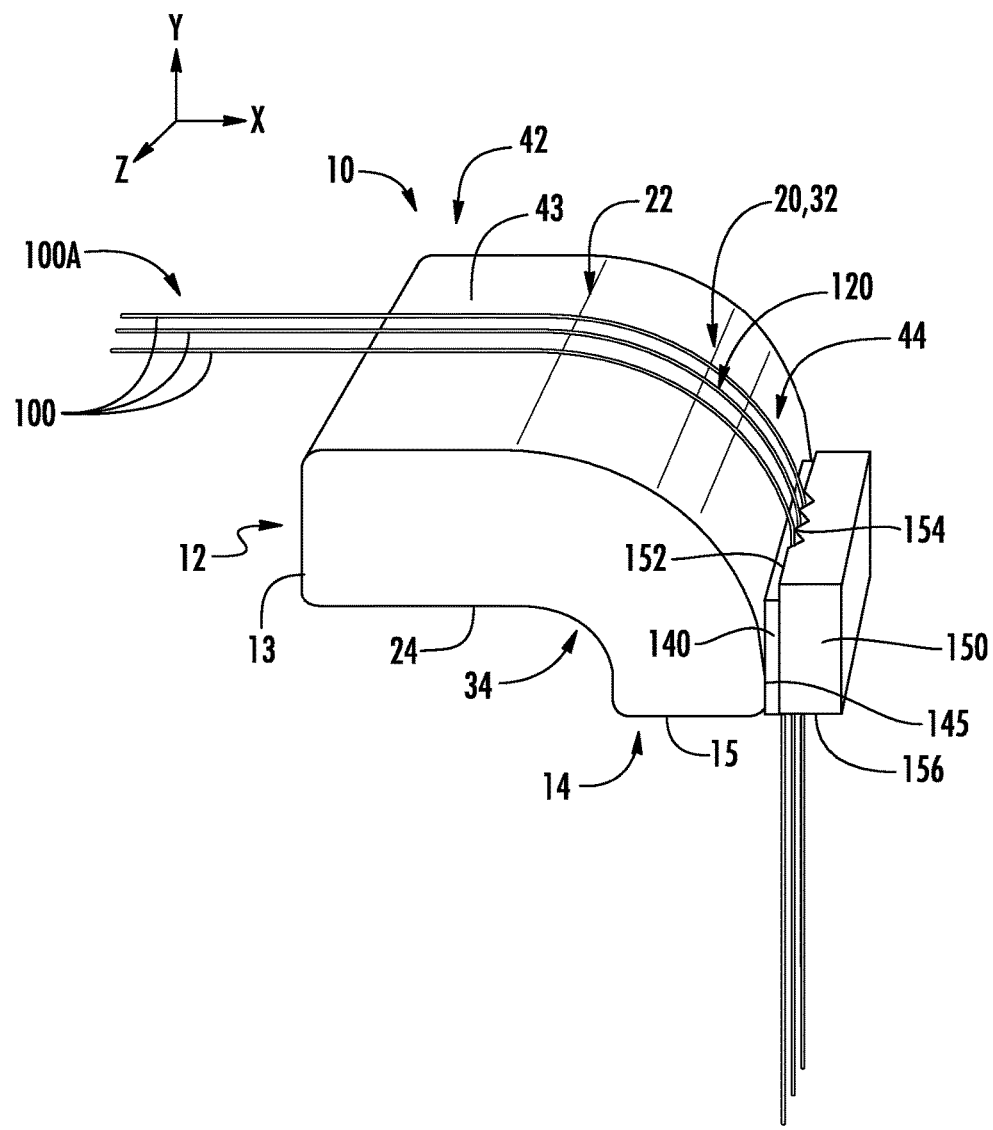

With reference now to FIG. 3D, optical fibers 100 in optical fiber array 100 are rotated over outer surface 22 at the outer curved portion 32 and at front-end section 42 of support member 10 so that the optical fibers are supported by front-end flat portion 43 of the front-end section.

At this point, optical fibers 100 extend over front end 12 and back end 14 of support member 10. Here, front-end flat portion 43 of support member 10 can serve as a strain-relief feature for optical fibers 100 in optical fiber array 100A. During the process of disposing optical fibers 100 over outer surface 22, fiber gripper devices 130 are removed. The arrangement forms in each optical fiber 100 a bend section 120 that has an associated radius of curvature $R_F$ (see, e.g., FIG. 4A).

Figure 4A:
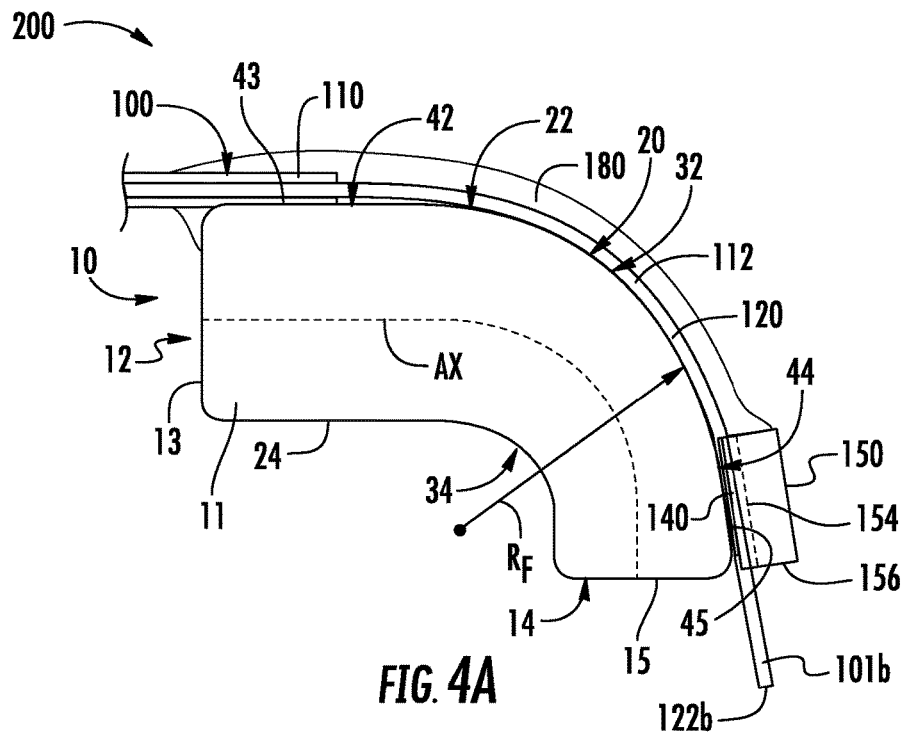
FIG. 4A is a cross-sectional view of an example optical interface device in the process of being formed using the method steps of FIGS. 3A through 3D, and further showing the addition of a securing layer over the optical fiber array.

With optical fiber array 100A disposed over outer surface 22 as described above, then with reference to the cross-sectional view FIG. 4A, a securing layer 180 can be placed over at least a portion of optical fibers 100 to secure them to outer surface 22 of support member 10. The securing layer 180 can also serve to protect the optical fibers 100 from damage during handling. In examples, securing layer 180 can comprise an adhesive or an epoxy material. The securing layer 180 can be applied to a selected portion of optical fiber array 100A (e.g., at front-end flat portion 43) or over the entire optical fiber array. In an example, a portion of securing layer 180 can extend beyond front end 12 of support member 10 to serve as a strain relief material to protect optical fibers 100 in optical fiber array 100A from damage during lateral or axial strains.

The resulting structure shown in FIG. 4A is referred to hereinafter as optical interface device 200 even though it still in the process of being fabricated. It is noted that in an example, optical fibers 100 can reside in substantially parallel x-y planes that are spaced apart in the z-direction, so that the original parallel configuration of optical fibers 100 is preserved during the fabrication process. In other embodiments, optical fibers 100 can be arranged in a select configuration wherein the optical fibers are non-parallel, or are parallel only for one or more sections of optical fiber array 100A. For example, the optical fibers 100 can have different pitches at respective locations adjacent the front and back ends 12 and 14 of support member 10.

In an example, it may be advantageous to strip off coating 110 from the portion of optical fibers 100 adjacent outer curved portion 32 of outer surface 22 so that only bare fiber sections 112 experience the greatest amount of bending. The bare fiber sections 112 can be strengthened through subsequent processing. For example, bare fiber sections 112 can be thermally annealed to eliminate cracks and surface defects prior to applying securing layer 180. The securing layer 180 can also take the place of coating 110 in that it serves to protect bare fiber sections 112.

Figure 4B:
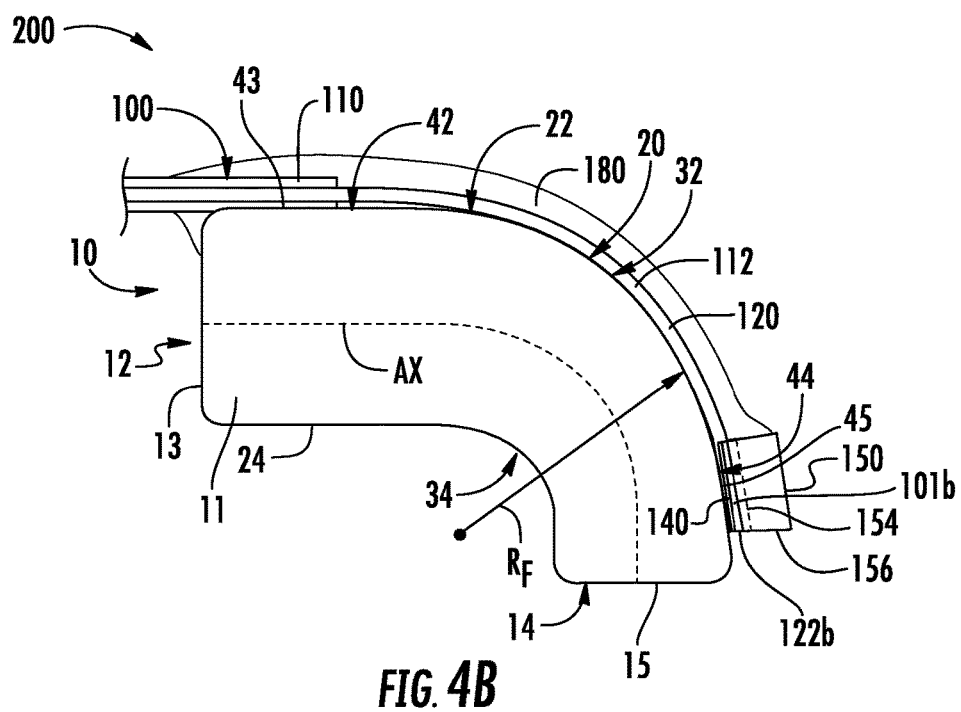
FIG. 4B is similar to FIG. 4A and shows the optical fibers having been cleaved at the back end of the fiber securing device.
Figure 4C:
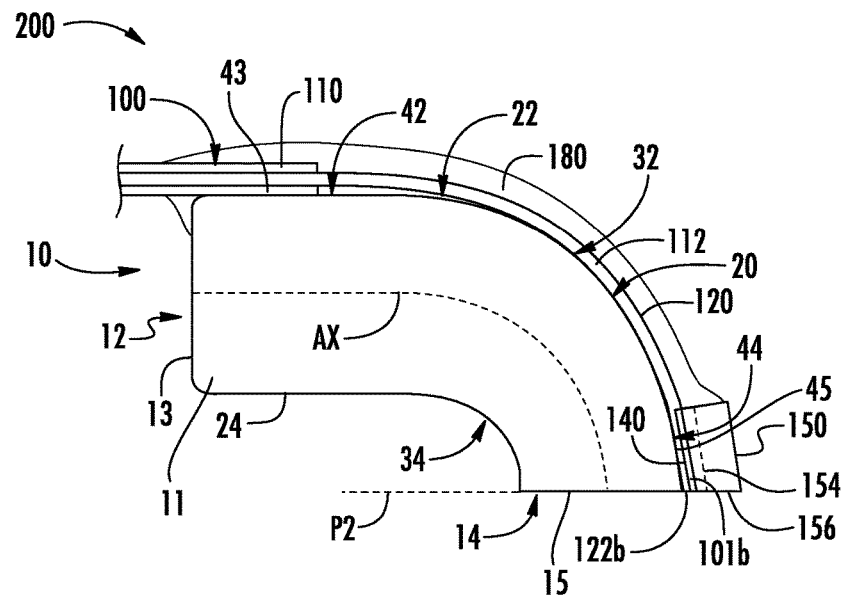
FIG. 4C is similar to FIG. 4B and shows the back end of the support member and the bottom end of the fiber securing device having been polished so that they reside in a common plane.

FIGS. 4B and 4C are similar to FIG. 4A and illustrate the next steps in the example method of forming optical interface device 200. The next steps include removing the excess length of optical fibers 100 that extend beyond bottom surface 156 of fiber alignment member 150, as shown in FIG. 4B. The removal of excess length of optical fibers 100 can be accomplished by standard cleaving methods, such as mechanical scoring and breaking, or via laser cleaving (using, for example, a $CO_2$ laser). The portions of optical fibers 100 that extend over front end 12 of support member 100 are used to connect to an optical device, as explained below with respect to FIG. 8.

Once the excess length of optical fibers 100 is removed as shown in FIG. 4B, then the next step involves polishing back end 14 of support member 10 as well as bottom surface 156 of fiber alignment member 150 to obtain the result as shown in FIG. 4C. The polishing step is performed to ensure that second end portions 101b of optical fibers 100 have the same length and that their end faces 122*b* have the same high-quality optical finish and terminate at plane P2. The polishing step is also required to remove excess material from back end 14 of support member 10 as well as excess material from fiber alignment member 150. In particular, this includes portions of back-end section 44 at back-end flat portion 45 that may be distorted due to corner rounding induced during the drawing process, and also includes portions of fiber alignment member 150 at bottom surface 156.

In one example, the polishing process can be performed by mounting support member 10 in a fixture (not shown) and using mechanical polishing (e.g., a diamond polishing wheel) to simultaneously polish both the back-end flat surface 15 of support member 10 and the back end 156 of the fiber alignment member 150, as well as the fiber end faces 122*b* of the optical fibers 100 held by the fiber alignment member.

The polishing step can also be performed to ensure that optical fibers 100 have the proper angle for suitable optical back reflection performance (i.e., reflection reduction), which in an example is about an 8-degree angle. The polishing process also creates the aforementioned common plane P2 for end faces 122*b* of optical fibers 100 and back-end flat surface 15. It is noted that common plane P2 need not lay exactly in an x-z plane and in an example is slightly tilted to provide the aforementioned reflection reduction.

Figure 5:
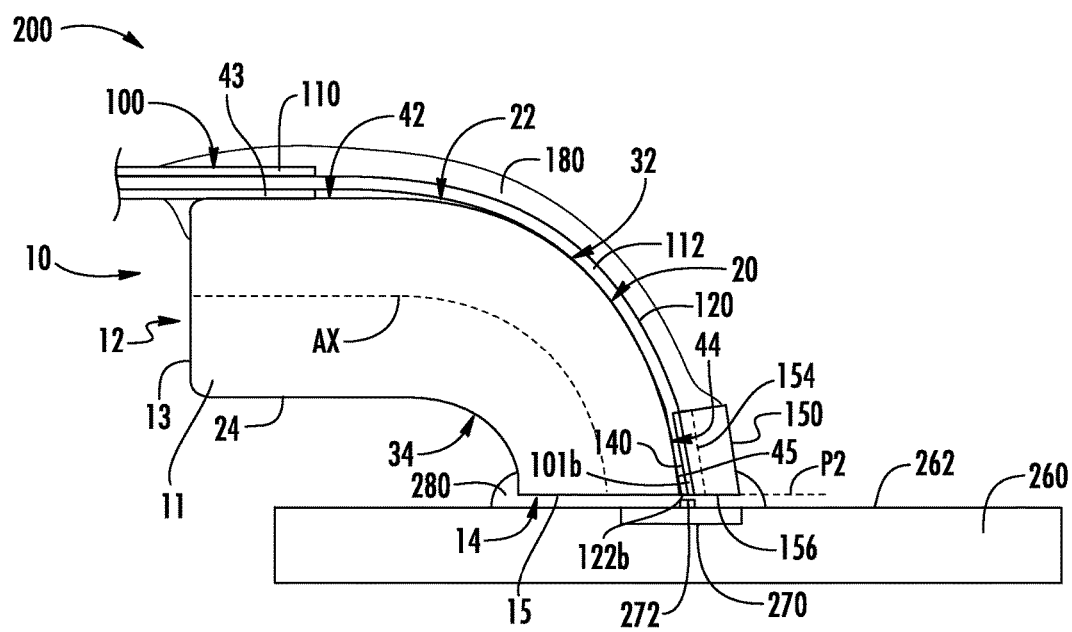
FIG. 5 is a cross-sectional view of the example optical interface device operably arranged with a PICB that operably supports a photonic device.

FIG. 5 is a cross-sectional view of the example optical interface device 200 operably arranged relative to a PICB 260. The PICB 260 includes an upper surface 260 and supports at least one photonic device 270. The photonic device 270 may be a passive photonic device, such as a waveguide grating vertical coupler that is fabricated on the surface 262 of PICB 260. The photonic device 270 has at least one photoactive element 272, which can be a photoemitter (i.e., light source) or a photodetector (i.e., light receiver). The optical interface device 200 is arranged such that each optical fiber end portion 101*b* is aligned with one of the photoactive elements 272, with the fiber end face 122*b* arranged adjacent the photoactive element.

In an example, support member 10 of optical interface device 200 is joined to PICB 260 using a thin layer of optical index matched light-curable adhesive 280. In an example, adhesive layer 180 is thin to minimize misalignment during curing and to prevent excessive optical losses during coupling between a given optical fiber and the corresponding photoactive element 272. Thus, in an example, a thin layer of adhesive 280 resides between fiber end faces 122*b* and photoactive elements 272.

Figure 6A:
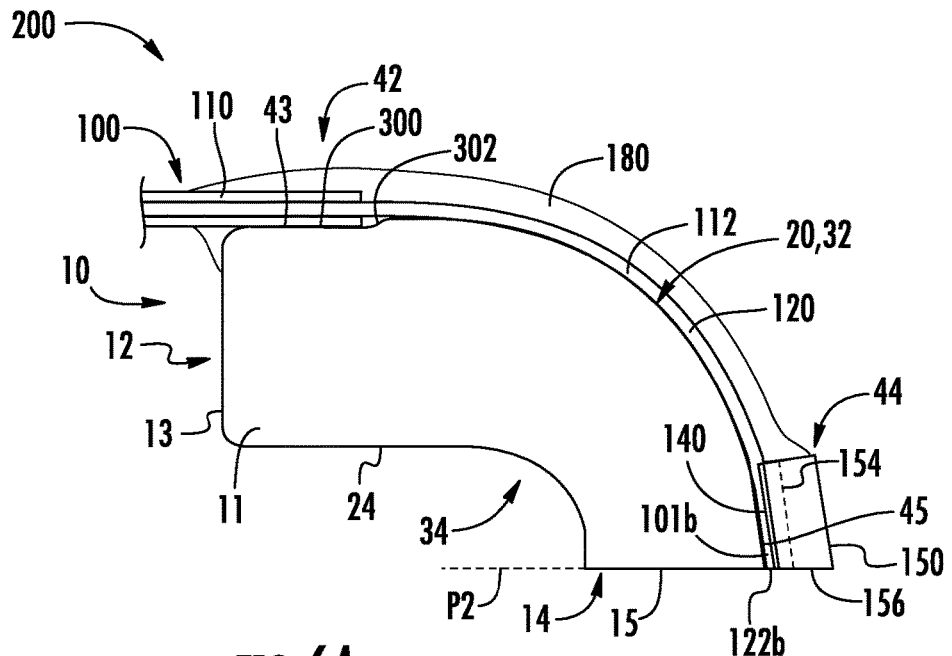
FIG. 6A is similar to FIG. 4C and shows an example optical interface device wherein the support member includes a relief feature in the front-end section.

FIG. 6A is similar to FIG. 4C and illustrates an embodiment wherein support member 10 includes a front-end relief feature 300 located in outer surface 22 in the front-end flat portion 43 of front-end section 44. The first relief feature 300 is for reducing stress on bare fiber sections 112 during assembly of optical interface 200 or during its use. In an example, the first relief feature 300 is defined by a first angled step 302 formed in outer surface 22 either within front-end flat portion 43 or at the transition between the flat front-end portion and outer curved portion 32 of support member 10. The angled step 302 can have a height selected to match a radial difference between the bare optical fiber radius and the coated optical fiber radius. This radial difference is typically tens of microns, but it could be larger depending on the thickness of optical fiber coating 110.

The front-end relief feature 300 is positioned at a location that provides sufficient area for optical fiber attachment in the front-end flat portion 43 of front-end section 42. After optical fibers 100 are brought into contact outer surface 22 of support member 10, they can then be permanently secured by applying securing layer 180.

Figure 6B:
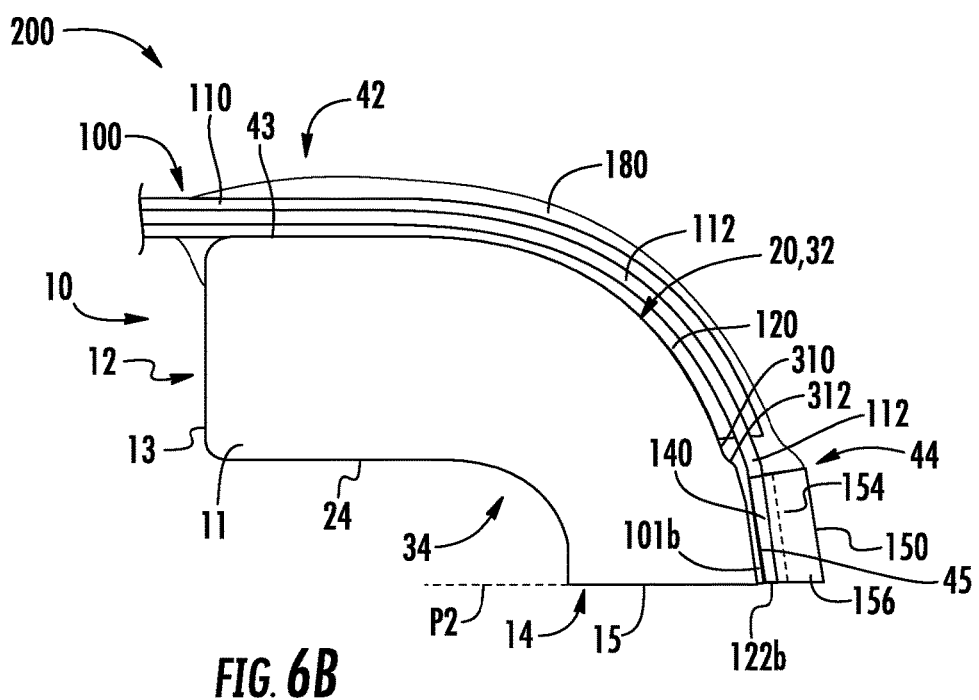
FIG. 6B is similar to FIG. 6A and shows an example optical interface device wherein the support member includes a relief feature in the back-end section.

FIG. 6B is similar to FIG. 6A and illustrates an example embodiment of a back-end relief feature 310 formed in the back-end flat portion 45 of back-end section 44. Like the front-end relief feature 300, back-end relief feature 310 is for reducing stress on bare fiber sections 112 during assembly of optical interface 200 or during its use. In the embodiment of FIG. 6B, only a small portion of optical fiber 100 that resides adjacent back-end flat portion 45 is a bare fiber portion 112.

In an example, the back-end relief feature 300 is defined by a second angled step 312 formed in outer surface 22 either within back-end flat portion 45 or at the transition between the flat back-end portion and outer curved portion 32 of support member 10. The second angled step 312 can have a height selected to match the radial difference between the bare optical fiber radius and the coated optical fiber radius. An advantage of second relief feature 310 is that optical fibers 100 can include coating 110 at bend section 20 of support member 10.

Figure 7A:
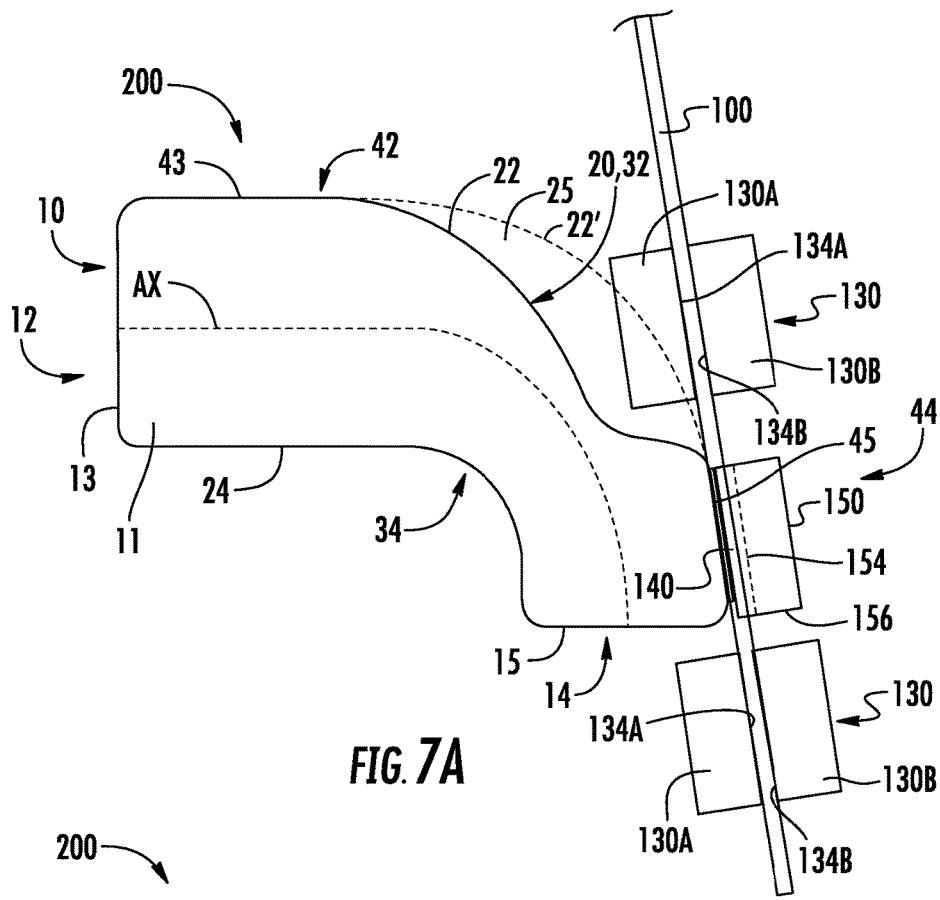
FIGS. 7A through 7C are cross-sectional views of an example optical interface device wherein the support member includes a recess in the outer surface at the outer curved portion that serves as a relief feature for the optical fibers supported by the support member.
Figure 7B:
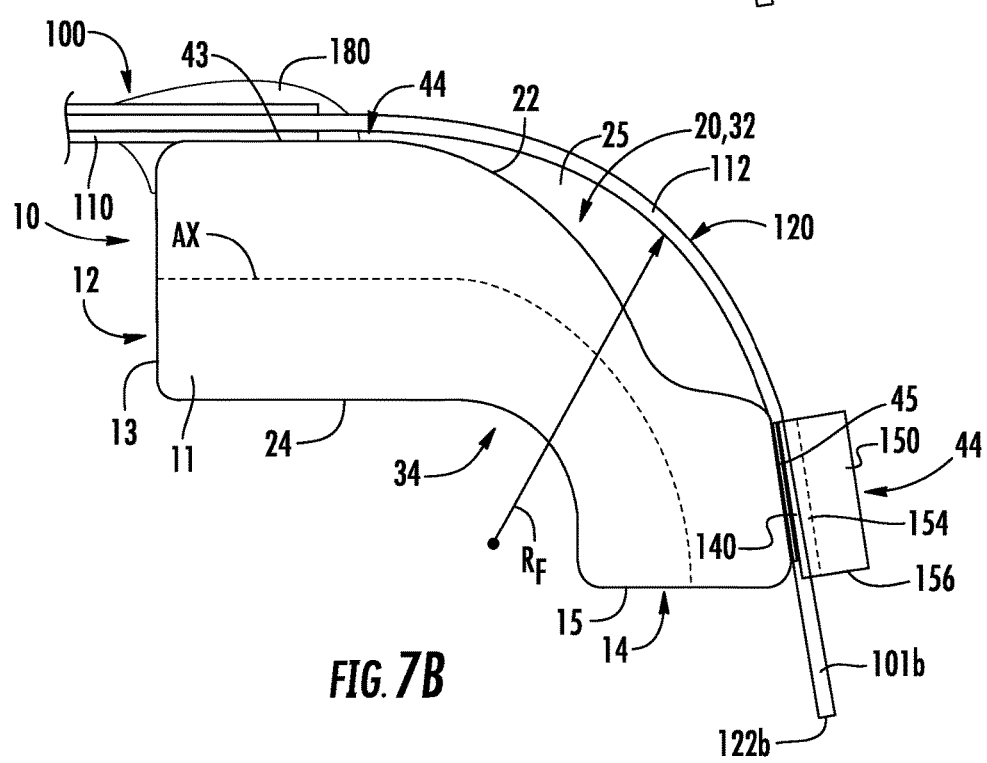
Figure 7C:
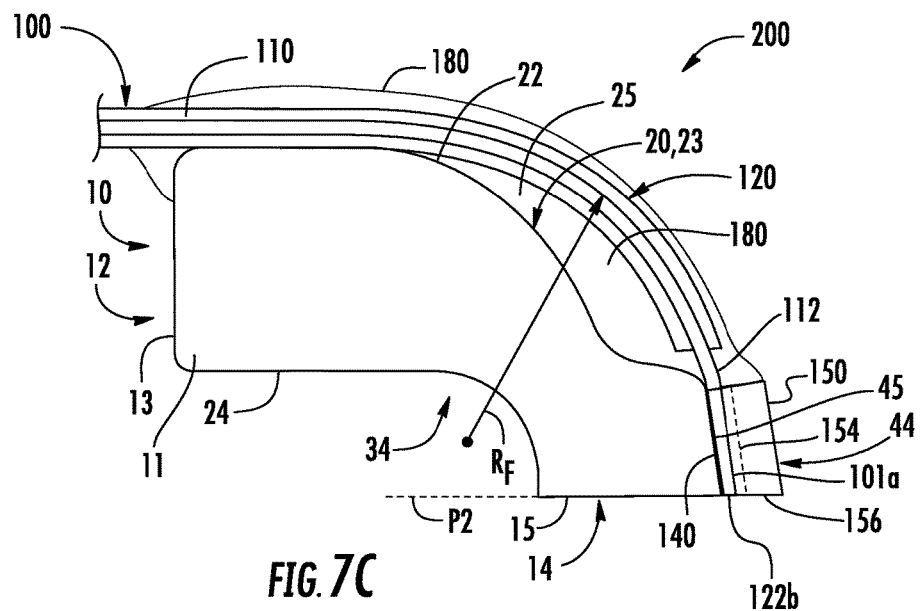

FIGS. 7A and 7C are cross-sectional views of an example optical interface device 200 that utilizes an example support member 10 wherein outer surface 22 is configured such that optical fibers 100 do not contact the outer surface for at least a portion of outer curved portion 32 of bend section 20. In an example, support member 10 includes a recess 25 formed in outer surface 22, wherein the dashed line 22' in FIG. 7A shows the location of a non-recessed outer surface by way of comparison. This configuration allows for the uppermost fiber gripper device 130 to be placed closer to fiber alignment member 150, which in turn allows for optical fibers 100 to be held more securely during the alignment and attachment process, which is illustrated in FIGS. 7A and 7B.

If fiber gripper blocks 130A and 130B are provided with precision fiber alignment features 136A and 136B respectively, a simplified low-cost fiber alignment member 150 that does not require its own precision fiber alignment features 154 may be employed. For example, the fiber alignment member 150 may be fabricated from a sheet of flat thin glass cut to a size that roughly matches the dimensions of back-end flat portion 45. In this case, a force may be applied on fiber alignment member 150 that presses the optical fiber array 100A into contact with the back-end flat portion 45. In an example, the alignment of optical fiber array 100A along a line in the x-direction is determined by pressure from fiber alignment member 150 on the back-end flat portion 45, while alignment of optical fiber array 100A on a precise pitch in the z-axis direction is controlled by precision fiber alignment features 136A and 136B of fiber gripper blocks 130A and 130B.

With continuing reference to FIGS. 7A through 7C, once fiber alignment member 150 is attached to back-end flat portion 45 of back-end section 44, and the optical fibers 100 are provided with the desired bending at bend section 20, the optical fibers are attached to the front-end flat portion 43 of front-end section 42 as described above. The optical fibers 100 can have a bend radius $R_F$ that is different from the bend radius $R_{32}$ of outer curved portion 32 of outer surface 22 in bend section 20 due to recess 25 formed therein. In the embodiments described above that do not include recess 25, the fiber bend radius $R_F$ is substantially the same as the bend radius $R_{32}$ of outer curved portion 32 at bend section 20.

During the process of arranging and securing optical fibers 100, the optical fiber bend radius $R_F$ can be adjusted by displacing the optical fibers along their respective fiber axes AF. Once the desired optical fiber bend radius $R_F$ is obtained, optical fibers 100 are secured (e.g., permanently bonded) to front-end flat portion 43 of front-end section 42.

The recess 25 formed in outer surface 22 of support member 10 serves as a bend relief feature and ensures that optical fibers 100 do not contact the outer surface 22 of support member 10 over a least some of outer curved portion 32. This can be desirable to minimize stress on the bent optical fibers 100 since they are free to move when they experiences internally induced forces (e.g., CTE-induced length change) or externally induced forces (e.g., G-shock forces). The bare fiber sections 122 of optical fibers 100 that reside adjacent recess 25 can be accessed for additional processing, such as laser heat treatments that can heat the optical fiber to anneal out surface defects.

FIG. 7C is similar to FIG. 7B and shows the addition of securing layer 180 that secures optical fibers 100 to support member 10. Note that securing layer 180 can fill recess 25. FIG. 7C also shows support member 10 and fiber alignment member 150 after having undergone the polishing process discussed above in connection with FIG. 4C. The embodiment of optical interface device 200 of FIG. 7C also shows an example where each optical fiber 100 includes its coating 110 except for a small bare fiber section 112 adjacent fiber alignment member 150.

Figure 8:
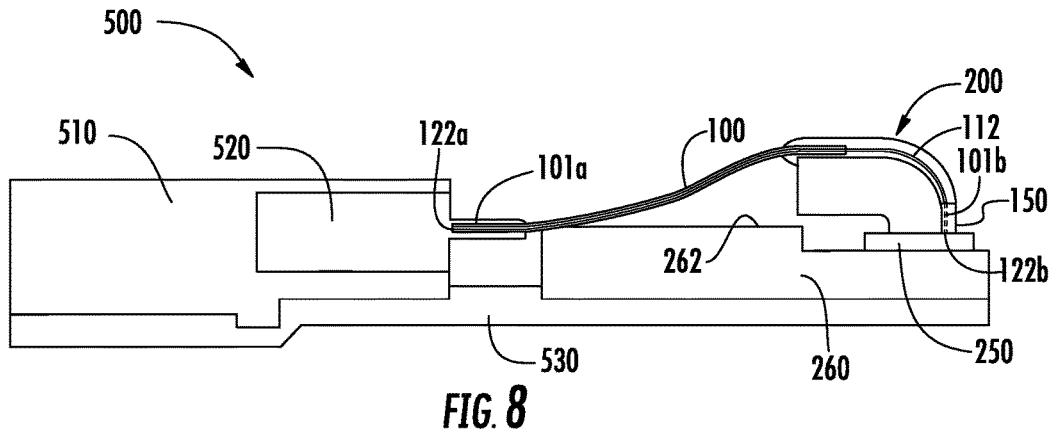
FIG. 8 is a side view of an example photonic device assembly that includes a PICB and the photonic device operably supported thereby and optically coupled to an optical device via an optical interface device as disclosed herein.

FIG. 8 is a side view of an example photonic device assembly 500 that includes PICB 260 optically coupled to an optical device 510 via the optical interface device 200 as disclosed herein. The optical device 510 includes an optical fiber connector 520 configured to receive respective first end portions 101a of optical fibers 100. The photonic device assembly 500 includes a package 530, such as a quad small-form-factor pluggable (QSFP) package. The optical interface device 200 thus facilitates optical communication between PICB 260 and optical device 510 of photonic device assembly 500. Such optical communication can occur in both directions, depending on the particular configuration of the one or more photonic devices 270 and the optical device 510.

It will be apparent to those skilled in the art that various modifications to the embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An optical interface device for optically connecting at least one photonic device to at least one optical device via at least one optical fiber, comprising:
    a support member having a body made of a single glass material and having an outer surface and a front-end section with a front end and a front-end flat portion, a back-end section with a back end and a back-end flat portion, wherein the glass body includes a bend section that includes a curved portion of the outer surface;
    at least one optical fiber arranged immediately adjacent at least a portion of the outer curved surface, the at least one optical fiber having a front-end portion that resides beyond the front end of the support member and includes a first end face, an opposite back-end portion that includes a second end face, and a fiber bend section between the first and second end faces and that resides at the support member bend section;
    a fiber alignment member having bottom and front surfaces, the front surface having at least one fiber alignment feature, with the fiber alignment member being secured to the back-end flat portion with the back-end portion of the at least one optical fiber engaged by the at least one fiber alignment feature and wherein the second end face is substantially co-planar with bottom surface of the fiber alignment member; and
    a securing layer disposed over the at least one optical fiber at least at the front-end section of the support member.

2. The optical interface device according to claim 1, wherein the support member has a height dimension LY in the range 2 millimeters≤LY≤4 millimeters.

3. The optical interface device according to claim 1, wherein the securing layer is disposed over the fiber bend section.

4. The optical interface device according to claim 1, wherein the support member is monolithic and made of glass.

5. The optical interface device according to claim 1, wherein the fiber alignment member is secured to the back-end flat portion using a frit or a light-activated adhesive material.

6. The optical interface device according to claim 1, wherein the at least one optical fiber includes a bare fiber portion at the fiber bend section.

7. The optical interface device according to claim 1, wherein the fiber bend section of the at least one optical fiber resides immediately adjacent the curved outer portion of the outer surface of the support member.

8. The optical interface device according to claim 1, wherein the at least one optical fiber defines a plurality of optical fibers, and wherein the fiber alignment member maintains the plurality of optical fibers so that they reside in substantially parallel planes.

9. The optical interface device according to claim 1, wherein the curved portion of the outer surface includes a recess, and wherein a portion of the securing layer resides within the recess and between the curved portion of the outer surface the fiber bend section of the at least one optical fiber.

10. A photonic device assembly comprising:
    the optical interface device according to claim 1 operably arranged relative the at least one photonic device, with the second end face of the at least one optical fiber optically coupled to the at least one photonic device; and
    the at least one optical fiber optically coupled to the at least one optical device via the first end face at the first end portion of the at least one optical fiber.

11. A method of forming an optical interface device for optically connecting one or more photonic devices to at least one optical device via at least one optical fiber, comprising:
    a) providing a support member having a body made of a single glass material and having an outer surface and a front-end section with a front end and a front-end flat portion, a back-end section with a back end and a back-end flat portion, wherein the glass body includes a bend section that includes a curved portion of the outer surface;
    b) holding an array of optical fibers in a select configuration;
    c) disposing the array of optical fibers over the outer surface of the support member;
    d) securing the optical fibers to the outer surface of the support member with a securing layer disposed over the optical fibers at least at a front-end section of the support member and with a fiber alignment member having a bottom surface and a front surface, the front surface having at least one fiber alignment feature, such that the optical fibers have the select configuration, with each optical fiber having:
  i) a fiber bend section that resides adjacent the curved portion of the outer surface of the support member; and
  ii) a back-end portion that includes a first fiber end face that resides substantially in a plane defined by the a back end of the fiber alignment member,
wherein the fiber alignment member is secured to the back-end flat portion of the support member with the back-end portion of at least one of the optical fibers engaged by the at least one fiber alignment feature.

12. The method according to claim 11, wherein the selection configuration of act b) includes arranging the optical fibers to be substantially parallel.

13. The method according to claim 11, wherein act b) includes gripping the array of optical fibers at two different locations using first and second spaced apart gripper devices, and wherein either act c) or act d) includes removing the gripper devices from the optical fiber array.

14. The method according to claim 11, wherein the fiber alignment member includes V-groove fiber alignment features that operably engage the optical fibers.

15. The method according to claim 11, further comprising:
  cleaving the optical fibers at the bottom surface of the fiber alignment member to define the first fiber end face for each of the optical fibers; and
  polishing the bottom surface of the fiber alignment member and the back end of the support member so the first fiber end faces, the bottom surface of the fiber alignment member and the back end of the support member reside in a common plane.

16. The method according to claim 11, wherein the fiber alignment member is secured to the back-end flat portion of the support member via a frit or a light-activated adhesive.

17. The method according to claim 11, further comprising forming the support member using a drawing process.

18. The method according to claim 11, wherein the support member has a height dimension LY in the range 2 millimeters≤LY≤4 millimeters.

19. The method according to claim 11, further comprising disposing the securing layer over the fiber bend sections of the optical fibers.

20. The method according to claim 11, wherein each optical fiber includes a bare fiber portion at the fiber bend section.

21. The method according to claim 11, wherein the fiber bend section of the at least one optical fiber resides immediately adjacent the curved outer portion of the outer surface of the support member.

22. The method according to claim 11, wherein the curved portion of the outer surface includes a recess, and wherein act d) further comprises filling the recess with a portion of a securing layer disposed over the optical fiber array at the bend section of the support member.

23. The method according to claim 15, wherein the optical fibers include respective second fiber end faces opposite the first fiber end faces and further comprising:
  optically coupling the first fiber end faces to the one or more photonic devices; and
  optically coupling the second fiber end faces to at least one optical device.

24. A method of forming an optical interface device, comprising:
  a) providing a support member having a monolithic glass body that defines an outer surface and a front-end section with a front end and a front-end flat portion, a back-end section with a back end and a back-end flat portion, and a bend section that includes a curved portion of the outer surface;
  b) disposing an array of optical fibers over the outer surface of the support member in a select configuration;
  c) securing the array of optical fibers to the outer surface of the support member with a securing layer disposed over the optical fibers at least at a front-end section of the support member and with a fiber alignment member having a bottom surface and a front surface, the front surface having at least one fiber alignment feature to hold the optical fibers in the select configuration, with each optical fiber having:
    i) a fiber bend section that resides adjacent the curved portion of the outer surface of the support member; and
    ii) a back end portion that includes a first fiber end face that resides substantially in a plane defined by the a back end of the fiber alignment member,
wherein the fiber alignment member is secured to the back-end flat portion of the support member with the back-end portion of at least one of the optical fibers engaged by the at least one fiber alignment feature.

25. The method according to claim 24, wherein the support member has a height dimension LY in the range 2 millimeters≤LY≤4 millimeters.

26. The method according to claim 24, further comprising forming the support member using a drawing process.

27. An optical device for optically connecting at least one photonic device to at least one optical device via at least one optical fiber, comprising:
  a support member having a body made of a single glass material and having an outer surface and a front-end section with a front end and a front-end flat portion, a back-end section with a back end and a back-end flat portion, wherein the glass body includes a bend section that includes a curved portion of the outer surface;
  at least one optical fiber arranged immediately adjacent at least a portion of the outer curved surface, the at least one optical fiber having a front-end portion that resides beyond the front end of the support member and includes a first end face, an opposite back-end portion that includes a second end face, and a fiber bend section between the first and second end faces and that resides at the support member bend section; and
  a fiber alignment member having bottom and front surfaces, the front surface having at least one fiber alignment feature, with the fiber alignment member being secured to the back-end flat portion with the back-end portion of the at least one optical fiber engaged by the at least one fiber alignment feature and wherein the second end face is substantially co-planar with the bottom surface of the fiber alignment member.

28. The optical device of claim 27, wherein the curved portion of the outer surface comprises a radius between 0.9 millimeters and 3.5 millimeters.

29. An optical interface device for optically connecting at least one photonic device to at least one optical device via at least one optical fiber, comprising:
  a support member having an outer surface and a front-end section with a front end and a front-end flat portion, a back-end section with a back end and a back-end flat portion, wherein the support member includes a bend section that includes a curved portion of the outer surface;

at least one optical fiber arranged immediately adjacent at least a portion of the outer surface, the at least one optical fiber having a front-end portion that resides beyond the front end of the support member and includes a first end face, an opposite back-end portion that includes a second end face, and a fiber bend section between the first and second end faces and that resides at the support member bend section;

a fiber alignment member having a bottom surface and at least one fiber alignment feature, the fiber alignment member being secured to the back-end flat portion with the back-end portion of the at least one optical fiber engaged by the fiber alignment member and wherein the second end face is substantially co-planar with bottom surface of the fiber alignment member; and a securing layer disposed over the at least one optical fiber at least at the front-end section of the support member.

* * * * *